United States Patent [19]

Gelles et al.

[11] Patent Number: 5,002,997
[45] Date of Patent: Mar. 26, 1991

[54] MODIFIED BLOCK COPOLYMER/OIL BLENDS

[75] Inventors: Richard Gelles; Lorelle A. Pottick; Carl L. Willis, all of Houston, Tex.

[73] Assignee: Shell Oil Company, Houston, Tex.

[21] Appl. No.: 493,603

[22] Filed: Mar. 15, 1990

[51] Int. Cl.$^5$ ............................................. C08K 53/00
[52] U.S. Cl. ...................................... 524/505; 524/534
[58] Field of Search ................................ 524/534, 505

[56] References Cited

U.S. PATENT DOCUMENTS

| | | | |
|---|---|---|---|
| 3,485,787 | 12/1969 | Haefele et al. | 260/33.6 |
| 3,577,357 | 5/1971 | Winkler | 260/2.2 |
| 3,827,999 | 8/1974 | Crossland | 260/33.6 AQ |
| 3,830,767 | 8/1974 | Condon | 260/28.5 B |
| 4,086,171 | 4/1978 | Wood et al. | 252/33 |
| 4,377,647 | 3/1983 | Durbin et al. | 525/901 |
| 4,868,245 | 9/1989 | Pottick et al. | 525/370 |

Primary Examiner—Joseph L. Schofer
Assistant Examiner—Mark Sweet

[57] ABSTRACT

A blend of a modified thermoplastic block polymer of a conjugated diene and an alkenyl arene with an extender resin compatible with the conjugated diene block is described herein. The block copolymer is first selectively hydrogenated and thereafter modified by grafting carboxyl functional groups primarily in the alkenyl arene blocks.

12 Claims, No Drawings

MODIFIED BLOCK COPOLYMER/OIL BLENDS

FIELD OF THE INVENTION

This invention relates to novel blends of a selectively hydrogenated and functionalized block copolymer and an extender resin. More particularly, it relates to novel modified block copolymer/aliphatic oil blends with excellent mechanical properties at both room and elevated temperatures. The block copolymer comprises a selectively hydrogenated conjugated diene polymer block and an alkenyl arene polymer block having a carboxyl functional group grafted primarily in the alkenyl arene block.

BACKGROUND OF THE INVENTION

It is known that a block copolymer can be obtained by an anionic copolymerization of a conjugated diene compound and an alkenyl arene compound by using an organic alkali metal initiator. Block copolymers have been produced which comprise primarily those having a general structure A-B and A-B-A wherein the polymer blocks A comprise thermoplastic polymer blocks of alkenyl arenes such as polystyrene, while block B is a polymer block of a selectively hydrogenated conjugated diene. The proportion of the thermoplastic blocks to the elastomeric polymer block and the relative molecular weights of each of these blocks is balanced to obtain a rubber having unique performance characteristics. When the content of the alkenyl arene compound is small, the produced block copolymer is a so-called thermoplastic rubber. In such a rubber, the blocks A are thermodynamically incompatible with the blocks B resulting in a rubber consisting of two phases; a continuous elastomeric phase (blocks B) and a basically discontinuous hard, glass-like plastic phase (blocks A) called domains.

Since the A-B-A block copolymers have two A blocks separated by a B block, domain formation results in effectively locking the B blocks and their inherent entanglements in place between the A blocks and forming a network structure. These domains act as physical crosslinks anchoring the ends of many block copolymer chains while the copolymer is at a temperature below the glass transition temperature of the domains. The copolymer is easily processed while above the glass transition temperature of the domains which permits recycle of scrap unlike vulcanized or chemically cross-linked polymers. Such a phenomena allows the A-B-A rubber to behave like a conventionally vulcanized rubber in the unvulcanized state after melt processing and is applicable for various uses. For example, these network forming polymers are applicable for uses such as moldings of shoe sole, etc.; impact modifier for polystyrene resins and engineering thermoplastics; in adhesive and binder formulations; modification of asphalt; etc.

Conversely as the A-B block copolymers have only one A block, domain formation of the A blocks does not lock in the B blocks and their inherent entanglements. Hence, these diblock copolymers are referred to as non-network forming polymers. Moreover, when the alkenyl arene content is small resulting in a continuous elastomeric B phase, the strength of such polymers is derived primarily from the inherent entanglements of the various B blocks therein and to a much lesser extent the domain formation by the A blocks therein. However, the non-network forming polymers have found particular utility as viscosity index improvers (U.S. Pat. Nos. 3,700,748; 3,763,044; 3,772,196; 3,965,019; and 4,036,910). Non-network forming block copolymers are also utilized in adhesive and binder formulations and as modifiers or plasticizers for polystyrene resins and engineering thermoplastics (U.S. Pat. No. 4,584,338).

Network forming copolymers with a high alkenyl arene compound content, such as more than 70% by weight, provide a resin possessing both excellent impact resistance and transparency, and such a resin is widely used in the field of packaging. Many proposals have been made on processes for the preparation of these types of block copolymers (U.S. Pat. No. 3,639,517).

Both the network forming (A-B-A) and non-network forming (A-B) polymers may be handled in thermoplastic forming equipment and are soluble in a variety of relatively low cost solvents.

While in general these block copolymers have a number of outstanding technical advantages, one of their principal limitations lies in their sensitivity to oxidation. This behavior is due to the unsaturation present in the elastomeric section comprising the polymeric diene block. Oxidation may be minimized by selectively hydrogenating the copolymer in the diene block, for example, as disclosed in U.S. Pat. No. Re. 27,145 and the above referenced VI improver patents. For example, prior to hydrogenation, the block copolymers have an A-B or an A-B-A molecular structure wherein each of the A's is an alkenyl-arene polymer block and B is a conjugated diene polymer block, such as an isoprene polymer block or a butadiene polymer block preferably containing 35–55 mole percent of the condensed butadiene units in a 1,2 configuration.

Non-network forming (A-B) block copolymers are especially deficient in applications in which good mechanical integrity and deformation resistance are required. This behavior is a consequence of the lack of inherent entanglements of the various B rubber blocks and to a much lesser extent the domain formation of the A blocks therein which controls strength under tensile deformation.

Network forming copolymers are known to have particularly high tensile strengths at room temperature due to the formation of glassy phase arene block domains which act as physical crosslinks locking in the inherent entanglements within the rubbery B block matrix. The mechanical integrity of these domains and the resulting network structure appear to control the tensile strengths of these copolymers. Moreover, at elevated temperatures, the mechanical integrity of block copolymers is limited to the integrity of the hard phase arene block domain. For example, network forming copolymers having arene blocks of polystyrene have poor mechanical properties at high temperature which may be attributed to the weakening of the polystyrene domains above the polystyrene glass transition temperature (Tg) of 100° C. Improvements in the high temperature characteristics of the network forming block copolymers may be achieved by enhancing the integrity of the alkenyl arene domains to higher temperatures.

U.S. Pat. No. 4,868,245 teaches that substantial improvement in the high temperature capabilities of the block copolymer can be obtained by increasing the arene A block glass transition temperature (Tg), and by extending the mechanical integrity of the arene A block domains to higher temperatures. These performance characteristics are accomplished by grafting functional groups to the arene blocks, A, without substantially modifying the elastomeric B blocks. The high temperature properties are improved by grafting carboxyl functional groups in an all acid form, in a combination of their acid and neutralized metal carboxylate salt forms, or in an all neutralized metal carboxylate salt. Furthermore, the high temperature properties are also improved by increasing the degree of carboxyl functionality and/or by utilizing metal ions of increasing ionized valence states.

The glassy phase arene block domains in both the network and non-network forming polymers have a dramatic effect on the melt viscosity at temperatures in excess of the glass transition temperature of the arene A block. In order to render these materials more processable, other components are added such as processing aids which lower the viscosity and soften the polymer as described by Crossland et al. in U.S. Pat. No. 3,827,999; Gergen et al. in 3,865,776; and Hendricks et al. in Britain Patent No. 1,160,198. The mechanical properties of the block copolymers are adversely altered in these polymer blends.

The combination of non-functionalized, elastomeric block copolymers and extender resins that are compatible with the conjugated diene blocks is known such as described in U.S. Pat. Nos. 3,830,767; 3,827,999; and 3,485,787.

SUMMARY OF THE INVENTION

According to the present invention, there is provided a blend of an extender resin and a selectively hydrogenated block copolymer of an alkenyl arene and a conjugated diene to which carboxyl functional groups have been grafted primarily in the alkenyl arene block, the extender resin being compatible with the hydrogenated conjugated diene blocks. Each of the alkenyl arene block domains are preferably ionically crosslinked within the separate domain by neutralizing from 0 percent to 100 percent, preferably at least 50 percent, and most preferably at least 90 percent, of grafted carboxylic acid functional groups with metal ions of any positive valence, preferably mono-, di- or trivalent metal ions.

The block copolymer preferably has at least one polyalkenyl arene block (A) connected to a hydrogenated polydiene block (B). Furthermore, the copolymer may be linear or branched, with the term "branched" also including symmetric or asymmetric radial and star structures.

The grafted carboxyl groups are preferably present at between about an average of one functional group per alkenyl arene block and about an average of one functional group per aromatic ring of the alkenyl arene block.

Preferably, there is provided a 10% to 75% blend of an aliphatic hydrocarbon oil by weight with the functionalized, selectively hydrogenated block copolymer.

Most preferably, there is provided the functionalized selectively hydrogenated block copolymer as defined above, having at least two A blocks separated by a B block, wherein (a) each of the A blocks prior to hydrogenation is predominately a polymerized monoalkenyl arene block having an average molecular weight of about 1,000 to about 125,000 preferably about 1,000 to about 60,000, (b) each of the B blocks prior to hydrogenation is predominately a polymerized conjugated diene block having an average molecular weight of about 10,000 to about 450,000, preferably about 10,000 to about 150,000, (c) the A blocks constitute between about 1 and about 99, preferably between about 2 and about 60, and more preferably between about 2 and 40 percent by weight of the copolymer, (d) the unsaturation of the B blocks is less than about 10 percent, preferably less than about 5 percent and more preferably at most 2 percent, of the original unsaturation of the B blocks, (e) the unsaturation of the A blocks is greater than about 50 percent, preferably greater than about 90 percent, of the original unsaturation of the A blocks, and (f) the acid functional group is preferably present on the average from about one (1) of said functional groups per molecule of said copolymer to about one (1) of said functional groups per aromatic ring of said A block.

Most preferably, there is provided a 10 to 75% blend of the aliphatic hydrocarbon oil and the functionalized hydrogenated block copolymer, respectively. The blends are both thermally stable and processable in the melt.

DETAILED DESCRIPTION OF THE INVENTION

Selectively Hydrogenated Block Copolymer Base Polymer

The block copolymers employed herein may have a variety of geometrical structures, since the invention does not depend on any specific geometrical structure, but rather upon the chemical constitution of each of the polymer blocks and of the coupling agents utilized. The block copolymers employed in the present composition are thermoplastic elastomers and have a least one alkenyl arene polymer block A and at least one elastomeric conjugated diene polymer block B. The number of blocks in the block copolymer is not of special importance and the macromolecular configuration may be linear or branched, which includes graft, radial or star configurations, depending upon the method by which the block copolymer is formed. The radial or star configuration may be either symmetric or asymmetric.

Typical examples of the various structures of the precursor block copolymers used in the present invention are represented as follows:

(A-B)n (A-B)nA (B-A)nB

[(A-B)p]mX

[(B-A)p]mX

[(A-B)pA]mX and

[(B-A)pB]mX wherein A is a polymer block of an alkenyl arene, B is a polymer block of a conjuated diene, X is a residual group of a polyfunctional coupling agent having two or more functional groups, n and p are independent integer subscripts of 1 to 20 m is an integer subscript of 2 to 20.

Furthermore, the above-mentioned branched configurations may be either symmetrical or asymmetrical with respect to the blocks radiating from X.

The A blocks are preferably monoalkenyl arene. The term "monoalkenyl arene" will be taken to include particularly those of the benzene series such as styrene and its analogs and homologs including alpha-methylstyrene and ring alkylated styrenes, particularly ring-methylated styrenes, and other monoalkenyl polycyclic aromatic compounds such as vinyl naphthalene and the like. The preferred monoalkenyl arenes are styrene and alpha-methylstyrene, and styrene is particularly preferred.

The conjugated dienes are preferably ones containing from 4 to 8 carbon atoms. Examples of suitable such conjugated diene monomers include: 1,3-butadiene (butadiene), 2-methyl-1,3-butadiene (isoprene), 2,3-dimethyl-1,3-butadiene, and 1,3-pentadiene (piperylene), preferably butadiene and isoprene. Mixtures of conjugated dienes may also be used.

The blocks A may be either a homopolymer or a random or tapered copolymer of the monalkenyl arenes, and may contain some of the hydrogenated conjugated diene monomers so long as the monoalkenyl arene monomers predominate.

The blocks B may be either a homopolymer or a random or tapered copolymer of the hydrogenated conjugated dienes, and may contain some of the monalkenyl arene monomers so long as functionalization occurs primarily in the A blocks.

The preferred base block copolymers have demonstrated utility in the present invention and have the structures:

polystyrene-hydrogenated polybutadiene-polystyrene (S-EB-S), and
polystyrene-hydrogenated polyisoprene (S-EP)

Preferably, the block copolymers of conjugated dienes and alkenyl arenes which may be utilized include any of those materials which have 1,2-microstructure contents prior to hydrogenation of from about 7% to about 100%, preferably from about 25 to about 65%, more preferably 35 to 55%. Such block copolymers may contain various ratios of conjugated dienes to alkenyl arenes. The proportion of the alkenyl arene blocks is between about 1 and about 99 percent by weight of the multiblock compolymer. To exhibit elastomeric properties, the proportion of the alkenyl arene blocks in these block copolymers is between preferably about 2 and about 65 percent, and more preferably between about 5 and about 40 percent by weight. When the alkenyl arene content is not more than about 60 percent by weight, preferably not more than about 55 percent by weight, the precursor block copolymer has the characteristics of a thermoplastic elastomer. When the alkenyl arene content is greater than about 60 percent by weight, preferably more than about 70 percent by weight, the precursor block copolymer has the characteristics of a resinous polymer.

The average molecular weights of the individual blocks may vary within certain limits. In most instances, the monoalkenyl arene blocks will have average molecular weights in the order of about 1,000 to about 125,000, preferably about 1,000 to about 60,000, while the conjugated diene blocks either before or after hydrogenation will have average molecular weights in the order of about 10,000 to about 450,000, preferably about 11,000 to about 150,000. These molecular weights are most accurately determined by gel permeation chromatography and/or low angle light scattering techniques.

The block copolymer may be produced by any well known block polymerization or copolymerization procedures including the well known sequential addition of monomer techniques, incremental addition of monomer technique or coupling technique as illustrated in, for example, U.S. Pat. Nos. 3,251,905; 3,390,207; 3,598,888 and 4,219,627. As is well known in the block copolymer art, tapered copolymer blocks can be incorporated in the multiblock copolymer by copolymerizing a mixture of monomers utilizing the difference in their copolymerization reactivity rates. Various patents describe the preparation of multiblock copolymers containing tapered copolymer blocks including U.S. Pat. Nos. 3,251,905; 3,265,765; 3,639,521 and 4,208,356 the disclosures of which are incorporated herein by reference. Additionally, various patents describe the preparation of symmetric and asymmetric radial and star block copolymers including U.S. Pat. Nos. 3,231,635; 3,265,765; 3,322,856; 4,391,949; and 4,444,953; the disclosures of which patents are incorporated herein by reference.

Though the afore-mentioned illustrative patents are slanted to producing network forming block copolymers (e.g. A-B-A), the non-network forming block copolymers of the present application may also be prepared by an obvious variation or modification of these procedures; for example, (1) sequential polymerization of an A-B or B-A-B block copolymer; (2) utilizing a di-initiator to prepare a B-A-B block copolymer; (3) utilizing polyfunctional coupling agents to couple B-A-Li living copolymer segments to form a $(B-A)_n-X$ polymer, where X is the residual portion of the polyfunctional coupling agent incorporated as part of the polymer whose presence therein is of insignificant effect to the properties of the resulting polymer and where n is the number of block copolymer segments or arms attached to X; and (4) similarly utilizing polyfunctional coupling agents to couple B-A-Li living copolymer segments and B-Li living homopolymer or diene copolymer segments to form a $(B-A-)_y-X-(B)_z$ polymer, where X is as before and y and z represent the number of respective segments or arms attached to X.

These polymers and copolymers are selectively hydrogenated to increase their thermal stability and resistance to oxidation, and to improve mechanical properties. Selective hydrogenation of the polymer may be accomplished using any of the methods known in the prior art. The hydrogenation will preferably be accomplished using a method such as those taught in U.S. Pat. Nos. 3,494,942; 3,634,594; 3,670,054; 3,700,633 and Re 27,145, which are incorporated herein by reference. Most preferably, selective hydrogenation will be accomplished using one of the processes taught in U.S. Pat. No. 3,700,633. These hydrogenation processes involve the use of a suitable catalyst, particularly a catalyst or catalyst precursor comprising an iron group metal compound. In the methods described in the foregoing patents, the catalyst is prepared by combining an iron group metal, particularly a nickel or cobalt compound with a suitable reducing agent such as an aluminum alkyl. The preferred iron group metal compounds are carboxylates and alkoxides.

The block copolymers are selectively hydrogenated to convert (hydrogenate) at least about 80% of the ethylenic unsaturation initially contained therein without hydrogenating a significant amount of the aromatic unsaturation contained therein. The ethylenic unsaturation is preferably reduced to less than 10 percent of original ethylenic unsaturation and most preferably reduced to less than 2 percent of original ethylenic. Aromatic unsaturation is preferably reduced by less than 10% or original aromatic unsaturation by the selective hydrogenation.

It should be observed that the above-described polymers and copolymers may, if desired, be readily prepared by the methods set forth above. However, since many of these polymers and copolymers are commercially available, it is usually preferred to employ the commercially available polymer as this serves to reduce the number of processing steps involved in the overall process.

Acid Functionalized Block Copolymers

Carboxylic Acid

The modified block copolymers according to the present invention are preferably first grafted or substituted with carboxylic acid groups in the alkenyl arene block by the metalation process as described in copending U.S. Pat. No. 4,868,245 which is incorporated herein by reference. Exemplary reactions are given below:

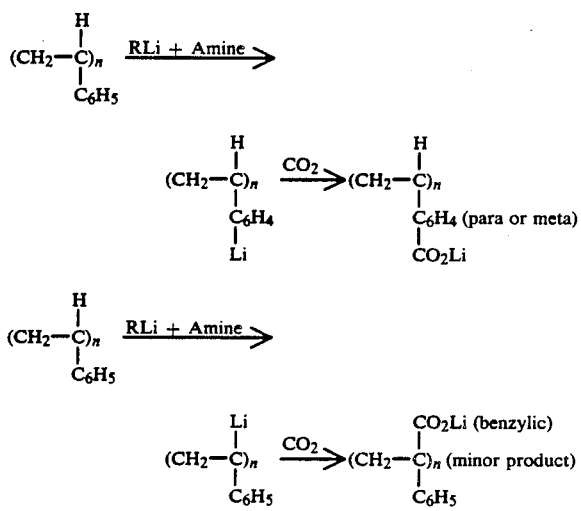

Where: RLi=Alkyl Lithium

The structure of the substituted block copolymer specifically determined by the location of the functionality on the alkenyl arene block gives the block copolymer a substantially greater degree of thermal stability.

In general, any materials having the ability to add carboxylic acid groups to the metalated base polymer, are operable for the purposes of this invention. In order to incorporate functional groups into the metalated base polymer, electrophiles capable of reacting with the metalated base polymer are necessary. Reactants may be polymerizable or nonpolymerizable; however, preferred electrophiles are nonpolymerizable or slowly polymerizing.

The preferred electrophile which will form graft polymers within the scope of the present invention is carbon dioxide. The grafted carboxyl functional group may be present as carboxylic acids, their salts, esters, and combinations thereof. Additionally, carboxyl functional groups in any of these forms may be further reacted with other modifying materials to convert one form to another thereby varying the relative proportions of each of these carboxylate forms to the others.

The quantity of molecular units containing carboxyl functional groups in the modified block copolymer is dependent on the content and the aromatic structure of the alkenyl arene therein. Once these parameters are fixed, the number of such groups present is dependent on the degree of functionality desired between a minimum and maximum degree of functionality based on these parameters. This minimum and maximum functionality level corresponds to about an average of one carboxyl functional group per A block and about an average of one carboxyl functional group per cyclic ring of the A block, respectively. It is currently believed that the average of one addition per ring is limiting. However, it still remains that the greater the degree of functionality (carboxyl group content) attained, the greater the property improvement.

Metalation may be carried out by means of a complex formed by the combination of a lithium component which can be represented by $R'(Li)_x$ with a polar metalation promoter. The polar compound and the lithium component can be added separately or can be premixed or pre-reacted to form an adduct prior to addition to the solution of the hydrogenated copolymer. In the compounds represented by $R'(Li)_x$, the $R'$ is usually a saturated hydrocarbon radical of any length whatsoever, but ordinarily containing up to 20 carbon atoms, and can also be a saturated cyclic hydrocarbon radical of e.g. 5 to 7 carbon atoms, a mono-unsaturated cyclic hydrocarbon radical of 5 to 7 carbon atoms. In the formula $R'(Li)_x$, x is an integer of 1 to 3. Representative species include, for example: methyllithium, isopropyllithium, sec-butyllithium, n-butyllithium, t-butyllithium, n-dodecyllithium, 1,4-dilithiobutane, 1,3,5-trilithiopentane, and the like. The lithium alkyls must be more basic than the product, metalated polymer alkyl. Of course, other alkali metal or alkaline earth metal alkyls may also be used; however, the lithium alkyls are presently preferred due to their ready commercial availability. In a similar way, metal hydrides may also be employed as the metalation reagent but the hydrides have only limited solubility in the appropriate solvents. Therefore, the metal alkyls are preferred for their greater solubility which makes them easier to process.

Lithium compounds alone usually metalate copolymers containing aromatic and olefinic functional groups with considerable difficulty and under high temperatures which may tend to degrade the copolymer. However, in the presence of tertiary diamines and bridgehead monoamines, metalation proceeds rapidly and smoothly.

Generally, the lithium metalates the position allylic to the double bonds in an unsaturated polymer. In the metalation of polymers in which there are both olefinic and aromatic groups, the metalation will occur in the position in which metalation occurs most readily, as in positions (1) allylic to the double bond, (2) at a carbon to which an aromatic group is attached, (3) in an aromatic group, or (4) in more than one of these positions. In the metalation of saturated polymers having aromatic groups as is preferably the case herein, the metalation will occur primarily in an aromatic group and as a minor product at a carbon to which an aromatic group is attached. In any event, it has been shown that a very large number of lithium atoms are positioned variously along the polymer chain, attached to internal carbon atoms away from the polymer terminal carbon atoms, either along the backbone of the polymer or on groups pendant therefrom, or both, in a manner depending upon the distribution of reactive or lithiatable positions. This chemistry distinguishes the lithiated copolymer from simple terminally reactive polymers prepared by using a lithium or even a polylithium initiator in polymerization thus limiting the number and the location of the positions available for subsequent attachment. With the metalation procedure described herein, the extent of the lithiation will depend upon the amount of metalating agent used and/or the groups available for metalation. The use of a more basic lithium alkyl such as tert-butyllithium alkyl may not require the use of a polar metalation promoter.

The polar compound promoters include a variety of tertiary amines, bridgehead amines, ethers, and metal alkoxides.

The tertiary amines useful in the metalation step have three saturated aliphatic hydrocarbon groups attached to each nitrogen and include, for example:

(a) Chelating tertiary diamines, preferably those of the formula $R_2N-(CH_2)_y-NR_2$ in which each R can be the same or different straight- or branched-chain alkyl group of any chain length containing up to 20 carbon atoms or more all of which are included herein and y can be any whole number from 2 to 10, and particularly the ethylene diamines in which all alkyl substituents are the same. These include, for example: tetramethylethylenediamine, tetraethylethylenediamine, tetradecylenediamine, tetraoctylhexylenediamine, tetra-(mixed alkyl) ethylene diamines, and the like.

(b) Cyclic diamines can be used, such as, for example, the N,N,N',N'-tetraalkyl 1,2-diamino cyclohexanes, the N,N,N',N'-tetraalkyl 1,4-diamino cyclohexanes, N,N'-dimethylpiperazine, and the like.

(c) The useful bridgehead diamines include, for example, sparteine, N,N,N,N',N'N'-triethylenediamine, and the like.

Tertiary monoamines such as triethyldiamine are generally not as effective in the lithiation reaction. However, bridgehead monoamines such as 1-azabicyclo[2.2.2] octane and its substituted homologs are effective.

Ethers and the alkali metal alkoxides are presently less preferred than the chelating amines as activators for the metalation reaction due to somewhat lower levels of incorporation of functional group containing compounds onto the copolymer backbone in the subsequent grafting reaction.

In general, it is most desirable to carry out the lithiation reaction in an inert solvent such as saturated hydrocarbons. Aromatic solvents such as benzene are lithiatable and may interfere with the desired lithiation of the hydrogenated copolymer. The solvent/copolymer weight ratio which is convenient generally is in the range of about 5:1 to 20:1. Solvents such as chlorinated hydrocarbon, ketones, and alcohols, should not be used because they destroy the lithiating compound.

Polar metalation promotors may be present in an amount sufficient to enable metalation to occur, e.g. amounts between 0.01 and 100 or more preferably between 0.1 to about 10 equivalents per equivalent of lithium alkyl.

The equivalents of lithium employed for the desired amount of lithiation generally range from such as about 0.001–3.0 per alkenyl aromatic hydrocarbon unit in the copolymer, presently preferably about 0.01–1.0 equivalents per alkenyl aromatic hydrocarbon unit in the copolymer to be modified. The molar ratio of active lithium to the polar promoters can vary from about 0.01 to about 10.0. A preferred ratio of active lithium to polar promoters is about 0.5 to about 2.0.

The amount of lithium alkyl employed can be expressed in terms of the lithium alkyl to alkenyl aromatic hydrocarbon molar ratio. This ratio may range from a value of 1 (one lithium alkyl per alkenyl aromatic hydrocarbon unit) to as low as $1 \times 10^{-3}$ (1 lithium alkyl per 1000 alkenyl aromatic hydrocarbon units).

The process of lithiation can be carried out at temperatures in the range of such as about $-70°$ C. to $+150°$ C., presently preferably in the range of about 25° C. to 75° C., the upper temperatures being limited by the thermal stability of the lithium compounds. The lower temperatures are limited by considerations of production cost, the rate of reaction becoming unreasonably slow at low temperatures. The length of time necessary to complete the lithiation and subsequent reactions is largely dependent upon mixing conditions and temperature. Generally the time can range from a few seconds to about 72 hours, presently preferably from about 1 minute to 1 hour.

The next step in the process of preparing the modified block copolymer is the treatment of the lithiated hydrogenated copolymer, in solution, without quenching in any manner which would destroy the lithium sites, with a species capable of reacting with a lithium anion. These species are selected from the class of molecules called electrophiles and must contain functional groups capable of undergoing nucleophilic attack by a lithium anion. As such, the modified block copolymer herein is the reaction product of an electrophile with an activated base (unmodified hydrogenated) block copolymer primarily at lithium anion sites on the aromatic substrates thereof, as opposed to the reaction product of an electrophile (strong Lewis acid) with an unactivated base block copolymer on the aromatic substrates thereof.

Neutralization of Modified Block Copolymer

The carboxylic acid functional groups in the A blocks of the block copolymers of the present invention are preferably "neutralized" by reacting the modified block copolymer with an ionizable metal compound to obtain a metal salt. The reaction mechanism involved in the formation of the ionic A block domains and the exact structure of these ionic clusters within the respective domains is not completely understood at the present time. However, it is believed that the increased high temperature properties of these ionic copolymers are the result of an ionic attraction between the metal ion and one or more ionized acid functional groups in the A block domains.

This ionic attraction results in a form of crosslinking which occurs in the solid state. However, when molten and subjected to the shear stresses which occur during melt fabrication, the ionic crosslinks with these A blocks of the copolymers of the present invention weaken and the polymer exhibits melt fabricatability. Moreover, these ion containing block copolymers are readily soluble in polar solvents and may be processed easily from solution. During cooling of the melt or during solvent evaporation, the ionic crosslinks are reformed or strengthened as the modified block copolymer solidifies and again exhibits the properties of a crosslinked material.

The improvement in the mechanical properties and deformation resistance resulting from the neutralization of the ionic A block domains is greatly influenced by the degree of neutralization and, therefore, the number of the ionic crosslinks and the nature of the crosslink involved. As earlier noted, an improvement in these properties over that of the unmodified block copolymer occurs when the acid functional groups are added to the block copolymer. A further enhancement in properties results as the degree of neutralization of the acid groups increases from 0 percent to 100 percent of total functionality content. Thus, as the degree of acid functionality and metal salt content are independently or jointly increased, a greater improvement in the high temperature properties of the modified block copolymer is observed. This phenomena is true so long as the acid functionalized block copolymer remains processable from the solution or melt state. Additionally, the viscosity index improvement produced by these polymers in lubricants and the like is also enhanced and rendered more stable as a result of these ionic attractions.

The metal ions which are suitable in forming the neutralized block copolymers of the present invention are positive valent ions of metals, preferably mono-, di- and trivalent ions of metals in Groups IA, IB, IIA, IIB, IIIA, IIIB, and VIII, of the Periodic Table of Elements. These metal ions can be complexed or uncomplexed, and can be used alone or in any mixture thereof. Suitable monovalent metal ions are $Na^+$, $K^+$, $Li^+$, $Cs^+$, $Ag^+$, $Hg^+$ and $Cu^+$. Suitable divalent metal ions are $Mg^{+2}$, $Ca^{+2}$, $Sr^{+2}$, $Ba^{+2}$, $Cu^{+2}$, $Cd^{+2}$, $Hg^{+2}$, $Sn^{+2}$, $Pb^{+2}$, $Fe^{+2}$, $Co^{+2}$, $Ni^{+2}$ and $Zn^{+2}$. Suitable trivalent metal ions are $Al^{+3}$, $Sc^{+3}$, $Fe^{+3}$, $La^{+3}$, and $Y^{+3}$. Preferable compounds are hydroxides, oxides, alcoholates, carboxylates, formates, acetates, methoxides, ethoxides, nitrates, carbonates and bicarbonates of the above-referenced metal ions.

The degree of functionalization and of neutralization may be measured by several techniques. For example, infrared analysis of elemental analysis may be employed to determine the overall degree of functionality. Additionally, the titration of a solution of the block copolymer with a strong base may be utilized to determine the degree of functionality and/or the degree of neutralization (metal salt content). Neutralization as used herein is based on the percentage of metal salt ions as compared to the total acid and metal salt functionality.

In general, it was found that the added metal ions react approximately stoichiometrically with the acid functional groups (acid form) in the polymer up to about 80-95 percent neutralization depending on the functional species. Thereafter, excess quantities of the metal compound are necessary to carry the neutralization to completion. However, in some instances, an excess of the neutralizing agent may be desirable.

The block copolymers, as modified, may still be used for any purpose for which the unmodified material (base polymer) was formerly used. That is, they may be used for adhesives and sealants, as modifiers for lubricants, fuels and the like, or compounded and extruded and molded in any convenient manner.

The desired degree of neutralization may be achieved by various methods. If the modified block copolymer is in an all acid form or in a partially neutralized form and additional neutralization is desired, neutralization is preferably carried out under conditions which allow for a homogeneous uniform distribution of the metal compound in the modified block copolymer. No particular reaction conditions are essential except that the conditions should preferably permit the removal of the neutralization product. More specifically, the neutralization reaction is preferably carried out either (1) by adding the metal compound, directly or in solution, to a solution of the modified block copolymer and then, on neutralization, precipitating and separating the resulting polymer; or (2) by melt blending the block copolymer with the metal compound. The melt blending is preferably conducted at elevated temperatures to facilitate homogeneous distribution of the metal compound and to volatize the neutralization product.

Alternatively, if the modified block copolymer is in an all neutralized salt form or in a partially neutralized form and additional acidification (i.e., reverse-neutralization) is desired, acidification is likewise preferably carried out under conditions which allow for a homogeneous uniform distribution of the acid in the modified block copolymer. The acid utilized is preferably a mineral acid such as sulfuric acid or hydrochloric acid. The resulting metal-salt acidification product is not believed to be harmful to the resulting modified block copolymer. However, the metal salt may be removed by conventional means if so desired.

As an additional alternative, the all acid and the all neutralized salt forms of the block copolymer may be blended with each other, by either the solution or melt blending method mentioned above, to achieve the desired degree of neutralization. It is to be understood, however, that the specific technique employed is not critical as long as it meets the requirements set forth above. The extent of the neutralization, i.e., the degree to which the metal ion is linked with the sulfonate ion may be readily analyzed by titration methods.

It is not essential that the metal compound be added as such, but it is possible to form the metal compound in situ from components which react with each other in the desired manner in the polymer environment. Thus, it is possible to add a metal oxide to the acid or partially neutralized block copolymer then add an acid such as acetic acid in the proper proportion and form the metal compound, i.e., the metal acetate, while the polymer is milled. The metal compound then neutralizes the block copolymer to the desired degree depending on the proportion of metal compound formed.

Block Copolymer/Extender Resin Blends

The selectively functionalized block copolymers described above exhibit improved processing and mechanical capabilities when blended with an extender resin in comparison to conventional block copolymer/extender resin blends. The extender resins can be any resin that is compatible with the polybutadiene blocks and not the alkenyl arene blocks. The block copolymers are preferably combined with an aliphatic hydrocarbon oil. Preferred blends, having 25 to 90% by weight block copolymer and 10 to 75% by weight of the oil, most preferably 25 to 75% of the oil, have good combinations of processability and tensile strength as shown in the examples that follow.

The extender resins blended with the block copolymers have the advantage of substantially reducing the cost of the composition with less than expected reductions in tensile strength. The resin should be one which is substantially compatible with homopolymers of conjugated dienes but which is substantially incompatible with homopolymers of the non-elastic (thermoplastic)

monoalkenyl arene blocks. Compatibility can be determined by the following type of test:

A resin to be tested is mixed in several proportions (e.g., 5, 50, 100 phr.) with the type of block copolymer of interest in a volatile mutual solvent, for example, tetrahydrofuran. A thin film is cast by spreading the solution evenly on a glass surface and allowing the solvent to evaporate over a period of 16-24 hours at ambient temperature. Suitability of the resin for use as an extender is judged by the tensile strengths of the resin-containing polymer films determined in pounds per square inch by an appropriate testing instrument and by the appearance of the film surface. Excessive compatibility with the terminal polymer segments will cause severe loss of tensile strength, greater than that resulting from simple dilution of the polymer. Excessive incompatibility will be evidenced by diffusion of the oil to the film surface.

The preferred extender resin is KAYDOL® Oil, available from Witco Chemical Company, which has a viscosity of 350 (SUS at 100° F.) and a pour point of $-10°$ F.

The oils typified by those described above may contain up to about 10% aromatic hydrocarbons by Clay-Gel Analysis, although, by carbon-type analysis aromatic carbons are essentially absent.

The compositions are preferably prepared by subjecting mixtures of the acid functionalized, hydrogenated block copolymer and at least a portion of the aliphatic hydrocarbon oil to mixing conditions at temperatures (50°-250° C.) suitable for expediting dispersion of the block copolymer in the oil. Although it is undesirable economically if it can be avoided, solution methods may be employed, namely, dispersion of the block copolymer in a relatively volatile solvent such as cyclohexane, addition of the non-aromatic oil to the solution and evaporation of the volatile solvent.

The polymer compositions of the present invention can also contain thermoplasic polymers which are not reactive with the modified block copolymer, and which are preferably non-polar, such as styrene polymers and olefin polymers, as a separate phase therein. These thermoplastic polymers can optionally be incorporated into the present polymer compositions to improve the processability of the composition without substantially detracting from the essential character of the modified block copolymer therein. The amount of the non-reactive thermoplastic polymer is preferably 100 parts by weight or less, more preferably 1 to 50 parts by weight, based on 100 parts by weight of the modified block copolymer.

The styrene polymers are polymer substances containing 50% by weight or more of styrene, such as polystyrene, styrene-α-methylstyrene copolymers, butadiene-styrene block copolymers and hydrogenated derivatives thereof, isoprene-styrene block copolymers and hydrogenated derivatives thereof, rubber modified high impact polystyrene, and mixtures thereof.

The olefin polymers are polymer substances containing 50% by weight or more of an olefin monomer unit containing ethylene, propylene, butene and the like. Typical examples of such polymers are low-density polyethylene, high density polyethylene, polypropylene, polybutene, ethylene-propylene copolymers and the like, including mixtures thereof.

The polymer compositions of the present invention can further contain other conventional additives. Examples of such additives are reinforcing materials such as silica, carbon black, clay, glass fibers, organic fibers, calcium carbonate and the like, as well as stabilizers and inhibitors of oxidative, thermal, and ultraviolet light degradation, lubricants and mold release agents, colorants including dyes and pigments, nucleating agents, fire retardants, plasticizers, etc.

The stabilizers can be incorporated into the composition at any stage in the preparation of the thermoplastic composition. Preferably, the stabilizers are included early to preclude the initiation of degradation before the composition can be protected. Such stabilizers must be compatible with the composition.

The compositions of the present invention can be molded or formed into various kinds of useful articles by using conventional molding, injection molding, blow molding, pressure forming, rotational molding and the like. Examples of the articles are sheets, films, foamed products as well as injection-molded articles having various kinds of shapes. These articles can be used in the fields of, for example, automobile parts, electrical parts, mechanical parts, footwear, medical equipment and accessories, packaging materials, building materials and the like.

EXAMPLES

To assist those skilled in the art in the practice of this invention, the following Examples are set forth as illustrations. It is to be understood that in the specification and claims herein, unless otherwise indicated, when amounts are expressed in terms of percent by weight, it is meant percent by weight based on the block copolymer.

It is to be understood that in the tables that follow where reference is made to "counterion" only the metal counterion will be listed with respect to the partially neutralized modified block copolymers with the hydrogen counterion relating to the remaining acid functionality being implied.

In the following Examples, films cast from solutions of the block copolymers of the present invention were tested using the following test procedures in the dry-as-cast state.

Tensile Stress at Break: ASTM-D412 using a shortened "D" dumbell die (L=1.6 cm as opposed to 3.3 cm). Test specimens were about 0.02-0.05 thickness. A crosshead speed of 1 inch per minute was used during testing operations except for Example 6 which was run at 5 inches per minute. The effective gauge length (i.e., the separation distance between the clamps) was 1.625 inches (40.6 mm) except for Example 4 which was 0.5 inches (12.7 mm). Samples were evaluated on an Instrom 1123 testing machine.

Glass Transition Temperature (Tg): Dynamic mechanical analysis utilizing a Rheovibron Dynamic Viscoelastometer. A frequency of 11 Hz over a temperature range from $-100°$ C. to 250° C. was utilized in each analysis.

The base (unmodified) block copolymers used were the polystyrene-poly(ethylene/butylene)-polystyrene (S-E/B-S) block copolymers shown in Table 1. The base block copolymers were the products of selectively hydrogenating a polystyrene-polybutadiene-polystyrene (S-B-S) block copolymer effected by use of a catalyst comprising the reaction products of an aluminum alkyl compound with nickel carboxylates. The base block copolymers have a residual ethylenic unsaturation of less than about 2% of the original unsaturation in the polybutadiene block and have a residual aromatic unsaturation of greater than 95% of the original unsaturation in the polystyrene block.

TABLE 1

| Base Block Copolymer | Styrene Content (wt.) | Block Styrene Content (wt.) | Total Mw. | Polymer Structure Block $M_n$ | |
|---|---|---|---|---|---|
| A | 30 | 30 | 51,500 | 7,700-36,000-7,700 | (S-EB-S) |
| B | 28 | 28 | 70,000 | 10,000-50,000-10,000 | (S-EB-S) |
| C | 28 | 28 | 158,000 | 44,000-114,000 | (S-EP) |

Remarks:
S - Polymer block composed chiefly of styrene.
EB - Polymer block composed chiefly of ethylene/butylene.
Mn - Number average molecular weight.
EP - Polymer block composed chiefly of ethylene/propylene.

Per the following examples, the base block copolymer was first modified to varying degrees of carboxyl group functionality (content) by grafting carboxyl groups onto the polystyrene blocks via the metalation process described in copending U.S. patent application Ser. No. 766,622 now abandoned. The modified block copolymers were then further modified with lithium, sodium, magnesium and zinc metals to form carboxylate salts at various acid to carboxylate salt contents (degree of neutralization). Films were then cast from a solution of 10% w solids in tetrahydrofuran (THF) for dynamic mechanical analysis and tensile strength measurements. Compression/deformation analysis were performed on molded plaques.

EXAMPLE 1

Carboxylic Acid Modified Block Copolymer

In this experiment, a carboxylic acid modified block copolymer "A1" was prepared utilizing the base block copolymer "A". A 5% (wt/wt) solution of Polymer A (see Table 1) in cyclohexane (3100 lb) was treated, in a closed vessel under nitrogen, with the metalation promoter, N,N,N',N'-tetramethylethylenediamine (TMEDA) (14 lb, 55 mol) and a titration indicator, 1,1-diphenylethylene (21 g, 0.1 mol). This solution was heated with stirring to 50° C. and titrated with s-butyllithium solution to remove impurities. At the endpoint of the titration, a slight excess s-butyllithium reagent added to the indicator forming a benzylic anion which gave the solution a yellow/orange color; the persistence of this color was taken as an indication that the solution was now anhydrous and anaerobic. These conditions were maintained throughout the rest of the experiment.

The metalation reagent, s-butyllithium (41 lb of a 12% (wt/wt) solution in cyclohexane, 35 mol), was added to the reaction mixture over a period of 15 minutes. The lithiated polymer cement was quite viscous and yellow in color. An aliquot of the cement was removed and treated with an excess of $D_2O$. This procedure placed a deuterium atom on the polymer at sites which had been lithiated. Analysis of the deuterated polymer using a Deuterium NMR technique found 89% of the deuterium was attached to the aromatic ring. Appropriate control experiments showed that the remainder of the deuterium label was at benzylic centers (about 5%) in the polystyrene segment and at allylic centers (about 6%) in the rubber of the polymer. These results showed that the polymer was lithiated principally in the styrene blocks (at least 94%).

After 1 hour in the lithiation reactor (60° C.), the cement was transferred to a closed vessel containing carbonated (142 lb of $CO_2$, 1500 mol) tetrahydrofuran (THF) (about 380 gal). The lithiated polymer cement was introduced below the surface of the $CO_2$/THF mixture. While carboxylation was likely instantaneous, the mixture was stirred at room temperature for 4 hr. The reactor product was acidified by the addition of 26 lbs. of acetic acid (200 mol). Modified block copolymer A1 was recovered by steam coagulation and dried at 50°-60° C. in a vacuum oven. Over 150 lb. of white, carboxylated block copolymer crumb, Polymer A1, was recovered.

To measure the polymer bound carboxyl acid (—COOH) content of Polymer A1, an aliquot of the finished polymer was dissolved in THF and titrated to a phenolphthalein endpoint using 0.01N KOH in methanol. The titration found 1.15% wt —COOH.

To determine the total carboxylate content, both —COO⁻ and —COOH moieties of Polymer A1, an aliquot of the finished polymer was dissolved in cyclohexane at a 10% solids level and treated with an equal volume of acetic acid. Control experiments had shown that the acid treatment converted polymer bound —COO⁻ to —COOH species. The acidified mixture was repeatedly washed with $H_2O$ until the wash sample was neutral to remove excess acetic acid and acetate salts. The fully acidified polymer was precipitated in isopropanol, dried and titrated as outlined above. The titration found 1.15% wt —COOH; the same result as had been observed for the as finished polymer. By difference, we concluded that the as finished product, Polymer A1, contained no carboxylate salt; Polymer A1 was in the all acid form —COOH.

An infrared analysis based upon characteristic IR bands for the —COOH species (1690 cm⁻¹) and polystyrene (1590 cm⁻¹) (in essence an internal standard signal) corroborated the titration results. The IR data were from a solution cast film of Polymer A1.

Polymers A2, B1, and C1 (see Table 2) were prepared using a modification of the procedure described for the preparation of Polymer A1. Polymers A2, B1, and C1 were prepared on a 5 lb scale using Polymer A, Polymer B, and Polymer C as a starting material, respectively. These preparations employed an increased amount of the metalation reagent (promoter) relative to the amount of polymer substrate. This led to products having higher carboxylate contents.

TABLE 2

| Modified Block Copolymer | Base Block Copolymer | Carboxyl functionality (% w-COOH) |
|---|---|---|
| A1 | A | 1.15 |
| A2 | A | 3.15 |
| B1 | B | 2.76 |
| C1 | C | 1.33 |

EXAMPLE 2

Carboxylate Salt Modified Block Copolymers

In this example, carboxylic acid modified block copolymers were neutralized utilizing monovalent metal counterions, such as sodium ($Na^{1+}$) and lithium ($Li^{1+}$), and divalent metal counterions, such as magnesium ($Mg^{2+}$) and zinc ($Zn^{2+}$). The neutralized modified block copolymers were obtained by adding aqueous sodium hydroxide, lithium hydroxide and zinc acetate solutions to the modified block copolymer (all acid) in THF, respectively. The modified block copolymers neutralized utilizing magnesium metal counterions were obtained by neutralizing the respective modified block copolymer (all acid) in toluene with magnesium methoxide in anhydrous methanol. For those neutralized modified block copolymers having a metal carboxylate salt content greater than 80% based on total carboxyl groups, an excess of the metal carrying compound was utilized (typically five times stoichiometric) to ensure the high degree of neutralization.

Table 3 indicates the various neutralized block copolymers produced from the corresponding carboxylic acid modified block copolymers for purposes of the following examples.

TABLE 3

| Modified Block Copolymer | Carboxyl functionality (% w) | Counterion | % Carboxyl Groups Neutralized |
|---|---|---|---|
| A1 | 1.15 | H | 0 |
| A1-Na | 1.15 | Na | 92 |
| A1-Mg | 1.15 | Mg | 97 |
| A1-Li-1 | 1.15 | Li | 45 |
| A1-Li-2 | 1.15 | Li | 80 |
| A1-Li-3 | 1.15 | Li | 95 |
| A1-Li-4 | 1.15 | Li | 50 |
| A1-Zn | 1.15 | Zn | >90 |
| A2 | 3.15 | H | 0 |
| A2-Li-1 | 3.15 | Li | 67 |
| A2-Li-2 | 3.15 | Li | >90 |
| B1 | 2.76 | H | 0 |
| B1-Li | 2.76 | Li | 65 |
| C1 | 1.33 | H | 0 |
| C1-Li | 1.33 | Li | — |

EXAMPLE 3

Effect of Oil Addition and Degree of Neutralization on Tg

In this example, the glass transition temperatures (Tg) of the polystyrene and poly(ethylene/butylene) phases of solution cast films of the base block copolymer "A" (control), and the carboxylated block copolymer having 1.15% w carboxyl functionality and a ratio of acid to lithium carboxylate salt of 100:0 (A1), 55:45 (A1-Li-1) and 5:95 (A1-Li-3) were measured with and without the addition of KAYDOL ® Oil.

As is readily apparent from the results in Table 4, carboxylation of the base block copolymer significantly increases the Tg of the polystyrene phase (S) without affecting the Tg of the poly(ethylene/butylene) phase (E/B). Furthermore, as the degree of neutralization (carboxylate salt content) is increased, there is a corresponding increase in the Tg of the polystyrene phase. The increase in the Tg of the polystyrene phase is attributed to the existence of ion pair associations (ionic crosslinking). Incorporating a metal counterion increases the strength of these ion pair associations, further hindering molecular motion within the polystyrene phase.

The addition of oil to both the modified block copolymer and the unmodified control results in a reduction in the Tg for both the polystyrene (S) blocks and the hydrogenated butadiene (E/B) blocks.

TABLE 4

| Block Copolymer | Oil % w | Counterion | Tg, E/B °C. | Tg, S °C. |
|---|---|---|---|---|
| Control | — | — | −42 | 97 |
| A1 | — | H | −42 | 120 |
| A1-Li-1 | — | Li | −42 | 129 |
| A1-Li-3 | — | Li | −42 | 135 |
| Control | 25 | — | −48 | 87 |
| A1 | 25 | H | −48 | 110 |
| A1-Li-1 | 25 | Li | −47 | 120 |
| A1-Li-3 | 25 | Li | −48 | 123 |

EXAMPLE 4

Effect of Oil Content and Degree of Neutralization on Tensile Properties of the Modified Block Copolymer The tensile properties at room temperature of solution cast films of modified block copolymer containing different levels of lithium carboxylate functionality with increasing levels of oil are summarized in Table 5. The tensile properties of the modified block copolymer and the modified block copolymer control (A1) without oil are similar. In general, the tensile properties of the neat material at room temperature appear unaffected with acid and salt functionality present on the polystyrene endblocks.

For both the modified block copolymer and the unmodified control, the addition of KAYDOL ® oil depresses the room temperature tensile strength. This effect is enhanced as the amount of oil present is increased. However, the % retention of the unoiled tensile strength is substantially higher in blends containing the modified block copolymer. The retention of properties is further enhanced when the hydrogen counterion is replaced with increasing amounts of lithium counterion. This effect of neutralization level on the retention of properties is more readily apparent in compositions containing 50 wt % oil.

The affinity of the oil to plasticize the styrene chains appears to be the same for both the modified block copolymer and the unmodified control, and hence cannot account for the tensile property results. However, it is believed that the oil does not influence the ionic interactions in the solid state such that the different levels of ionic associations in the polystyene blocks give rise to improved properties in the modified block copolymer/oil blend.

TABLE 5

| Block Copolymer | KAYDOL Oil Content (wt %) | Counterion | Tensile Stress at Break (psi) | Retention Unoiled Tensile Stress at Break |
|---|---|---|---|---|
| A | 0 | — | 5400 | — |
| A1 | 0 | $H^+$ | 6100 | — |
| A1-Li-1 | 0 | $Li^+$ (45%) | 5500 | — |
| A1-Li-3 | 0 | $Li^+$ (95%) | 5100 | — |
| A | 25 | — | 1700 | 31 |
| A1 | 25 | $H^+$ | 4150 | 68 |
| A1-Li-1 | 25 | $Li^+$ (45%) | 4300 | 78 |
| A1-Li-3 | 25 | $Li^+$ (95%) | 4200 | 82 |
| A | 50 | — | 235 | 4 |
| A1 | 50 | $H^+$ | 850 | 14 |
| A1-Li-1 | 50 | $Li^+$ (45%) | — | — |

TABLE 5-continued

| Block Copolymer | KAYDOL Oil Content (wt %) | Counterion | Tensile Stress at Break (psi) | Retention Unoiled Tensile Stress at Break |
|---|---|---|---|---|
| A1-Li-3 | 50 | Li+ (95%) | 1540 | 30 |

EXAMPLE 5

Effect of Degree of Neutralization and Oil Content on High Temperature Tensile Stress at Break In this example, the tensile strengths to break of solution cast films of the base block copolymer "A" (control), and the carboxylated block copolymer having a ratio of acid to lithium carboxylate salt at 100:0 (A1) and 5:95 (A1-Li-3) were measured at various temperatures without oil and with 50:50 ratio of the block copolymer and KAYDOL ® Oil.

As is readily apparent from Table 6, carboxylation of the base block copolymer significantly increases the high temperature tensile strength of the material. Furthermore, these high temperature properties are further enhanced as the degree of neutralization (metal carboxylate salt content) is increased. Thus, by varying the degree of neutralization, the modified block copolymer may be tailored to the desired task.

The combination of oil with the modified and unmodified block copolymers reduces the tensile strength when compared to the unoiled block copolymers at all temperatures examined. Carboxylation of the base block copolymer in the oil blends increases the tensile strength at elevated temperatures similar to the unoiled block copolymers. Moreover, the % retention in tensile strength of the unoiled blend at a given temperature is enhanced upon carboxylation of the base block copolymer.

EXAMPLE 6

Effect of Counterion and Oil Content on Tensile Stress at Break

In this example, the tensile strengths to break of solution cast films of the base block copolymer "A" (control) and the modified block copolymer with 1.15% w carboxyl functionality (content) having the counterions H1+ (A1), Na1+ (A1-Na), Li1+ (A1-Li-3), and Zn2+ (A1-Zn) were measured at room temperature without oil and with 50% by weight KAYDOL ® Oil.

Table 7 depicts the effect of different counterions and oil content on the tensile strength of the block copolymer. The metal carboxylate salts possess superior high temperature properties over those of the all acid material and base block copolymer. Moreover, the % retention of tensile strength increases when the hydrogen counterion is replaced by a variety metal counterions.

The carboxylated block copolymer/oil blends again retained unexpectedly high tensile strengths with the lithium salt exhibiting the highest tensile strength.

TABLE 7

| Sample | Counterion | Carboxyl Groups Neutralized | Tensile Stress at break, (psi) No Oil | Tensile Stress at break, (psi) 50% Oil | % Retention of Tensile Stress |
|---|---|---|---|---|---|
| A (Control) | — | — | 5300 | 435 | 8 |
| A1 | H | 0 | 5800 | 1210 | 20 |
| A1-Na | Na | 92 | 6800 | 1850 | 27 |
| A1-Li-3 | Li | 95 | 5900 | 2225 | 38 |
| A1-Zn | Zn | >90 | 5700 | 1725 | 30 |

While the present invention has been described and illustrated by reference to particular embodiments thereof, it will be appreciated by those of ordinary skill in the art that the same lends itself to variations not necessarily illustrated herein. For this reason, then, reference should be made solely to the appended claims for purposes of determining the true scope of the present invention.

What is claimed is:

1. A thermoplastic composition consisting of a blend of 10% to 75% by weight of the composition of an aliphatic hydrocarbon oil and 90% to 25% by weight of the composition of a functionalized, selectively hydrogenated block copolymer to which has been grafted carboxyl functional groups, the block copolymer having (a) at least one alkenyl arene polymer block A and
   (b) at least one substantially completely, hydrogenated conjugated diene polymer block B,
   (c) wherein substantially all of said carboxyl functional groups are grafted to said copolymer on said A blocks.

TABLE 6

| Block Copolymer | KAYDOL Oil Content % wt | Counterion | Room Temp. Tensile Stress at Break (psi) | Room Temp. % Ret | 70° C. Tensile Stress at Break (psi) | 70° C. % Ret | 100° C. Tensile Stress at Break (psi) | 100° C. % Ret | 150° C. Tensile Stress at Break (psi) | 150° C. % Ret |
|---|---|---|---|---|---|---|---|---|---|---|
| A | 0 | — | 5400 | — | 210 | — | 50 | — | — | — |
| A1 | 0 | H+ | 6100 | — | 1300 | — | 205 | — | 30 | — |
| A1-Li-3 | 0 | Li+ (95%) | 5100 | — | 3400 | — | 1200 | — | 250 | — |
| A | 50 | — | 235 | 4 | — | 0 | — | 0 | — | — |
| A1 | 50 | H+ | 850 | 14 | 105 | 8 | 15 | 7 | — | 0 |
| A1-Li-3 | 50 | Li+ (95%) | 1540 | 30 | 235 | 7 | 100 | 8 | 30 | 12 |

2. The copolymer according to claim 1, wherein said copolymer has at least two alkenyl arene blocks A that are connected by a hydrogenated diene polymer block B.

3. The copolymer according to claim 1, wherein the grafted carboxyl functional groups are present on the average in an amount from about one of said carboxyl functional groups per said A block to about one of said carboxyl functional groups per aromatic ring of said A block.

4. The copolymer according to claim 1, wherein at least 50 percent of the carboxyl functional groups are present as metal carboxylates including metal ions selected from the group consisting of monovalent metal ions, divalent metal ions, trivalent metal ions and combinations thereof.

5. The copolymer according to claim 4, wherein said metal ions are selected from the group consisting of lithium ions, sodium ions, magnesium ions, zinc ions, and combinations thereof.

6. The copolymer according to claim 1 wherein
(a) each of said A blocks prior to hydrogenation is predominantly a polymerized monoalkenyl monocyclic arene block having a number average molecular weight of about 1,000 to about 25,000,
(b) each of said B blocks prior to hydrogenation is predominantly a polymerized conjugated diene block having a number average molecular weight of about 1,000 to about 25,000,
(c) said A blocks constituting about 1 to about 99 percent by weight of said copolymer
(d) the residual ethylenic unsaturation of said B block, is less than about 10 percent of the ethylenic unsaturation of said B blocks prior to hydrogenation, and
(e) the residual aromatic unsaturation of said A blocks is greater than about 50 percent of the aromatic unsaturation of said A blocks, prior to hydrogenation.

7. The copolymer according to claim 6, wherein prior to hydrogenation:
(a) each A block is polymerized styrene and
(b) each B block is selected from the group consisting of polymerized isoprene, polymerized butadiene, and polymerized isoprene and butadiene copolymer.

8. The copolymer according to claim 7, wherein each B block is a polymerized butadiene block having a 1,2 content of between about 35 percent and about 55 percent.

9. The copolymer according to claim 8, wherein the polymerized butadiene blocks have an average molecular weight of between about 10,000 to about 150,000.

10. The copolymer according to claim 7, wherein the polymerized styrene blocks have an average molecular weight of between about 1,000 and about 60,000.

11. The copolymer according to claim 1, wherein the residual ethylenic unsaturation of the polymerized conjugated diene blocks is at most 2 percent of the ethylenic unsaturation present prior to hydrogenation.

12. The copolymer according to claim 1, wherein at least about 90% of the carboxyl functional groups are present as metal carboxylates.

* * * * *